US006990857B1

(12) United States Patent
Bourn et al.

(10) Patent No.: US 6,990,857 B1
(45) Date of Patent: Jan. 31, 2006

(54) FUEL INJECTOR TIMING TOOL

(75) Inventors: Gary D. Bourn, San Antonio, TX (US); John C. Hedrick, Boerne, TX (US); Steven G. Fritz, San Antonio, TX (US); Larry W. Wolter, Castroville, TX (US)

(73) Assignee: Southwest Research Institute, San Antonio, TX (US)

(*) Notice: Subject to any disclaimer, the term of this patent is extended or adjusted under 35 U.S.C. 154(b) by 9 days.

(21) Appl. No.: 10/926,861

(22) Filed: Aug. 26, 2004

(51) Int. Cl.
*G01M 15/00* (2006.01)

(52) U.S. Cl. .................................................... 73/119 A

(58) Field of Classification Search .................... 73/40, 73/46, 47, 49.7, 116, 117.2, 117.3, 118.1, 73/119 A, 119 R; 33/600, 601
See application file for complete search history.

(56) References Cited

U.S. PATENT DOCUMENTS 2,642,047 A 6/1953 Johnson
2,796,674 A 6/1957 Ross
2,819,534 A 1/1958 Kitzman
2,855,692 A 10/1958 Campbell
4,170,072 A 10/1979 Downs
4,202,207 A 5/1980 Johnson et al.
4,420,973 A * 12/1983 Garcia ....................... 73/119 A
4,503,619 A 3/1985 Nelsen et al.
4,711,216 A * 12/1987 Takeuchi et al. ............ 123/447
5,329,803 A * 7/1994 Booth ....................... 73/119 A
5,414,941 A 5/1995 Carpenter
6,622,549 B1 * 9/2003 Wlodarczyk et al. ..... 73/119 A

* cited by examiner

*Primary Examiner*—Eric S. McCall
(74) *Attorney, Agent, or Firm*—Gunn & Lee, P.C.; Ted D. Lee

(57) ABSTRACT

A fuel injector timing tool has an elongated tubular member on which a measurement device may be mounted. A lower end of the tubular member is attached to a base member disposed perpendicularly to the tubular member and has an open end that only partially circumscribes a plunger follower slidably disposed on a retainer element of the fuel injector. The timing tool permits ready access to an adjustable ball stud and associated lock nut mounted in a plunger actuator end of an injector rocker arm so that accurate plunger position can be set while the timing tool remains in place on the retainer element of the fuel injector.

8 Claims, 2 Drawing Sheets

FUEL INJECTOR TIMING TOOL

BACKGROUND OF THE INVENTION

1. Technical Field

This invention relates generally to a timing tool for measuring and setting the timing of fuel injectors and more particularly to such a tool for measuring and setting plunger position and travel of unit fuel injectors.

2. Background Art

Injection timing is a critical parameter for meeting emission standards on all diesel engines, including those used in locomotive and marine engines. Exact timing of the injectors is important because retarding the injection timing can reduce $NO_x$ emissions. However, if the injection timing is retarded beyond a target value, smoke emissions can increase above acceptable limits and the fuel consumption penalty can be excessive.

On many diesel engines, such as the General Motors Electro-Motive Division (EMD) engines, the fuel injection pump and spray nozzle are combined in a single compact unit called a unit injector. Unit injectors meter, atomize, and spray fuel into an associated cylinder of the engine. The pumping function of the injector is accomplished by the reciprocating motion of a constant stroke injection plunger which is actuated by an injector cam on the engine camshaft through an injector rocker arm. In the EMD engine unit injectors, the position of the plunger, and thereby the timing, is adjusted by means of a ball stud and lock nut at the injector actuating end of the rocker arm. The quantity of the fuel injected into each cylinder is varied by rotating the plunger mechanically by means of an injector control rack, or by electronically controlled valves. The plunger stroke remains constant at about ¾ of an inch.

The standard injection timing tool used for setting the injection timing in General Motors EMD engines is used to check the height of the injector plunger as the flywheel is set at a predetermined position. The tool has a steel shaft having a knurled end by which the tool is gripped. An end of the shaft opposite the knurled end has a narrow section that is inserted into a hole in the injector body. At the top of the narrow section, there is a step that acts as a stop to control extension of the tool into the hole so that the step rests directly on the top of the injector body. Above this step there is a larger shoulder that is adapted to be seated on a retainer element of the injector, and is spaced a predetermined distance from the step, for example 2.430 inches. It is this fixed distance between the step and the shoulder that allows the tool to be used as a feeler-type gauge for timing adjustment. The stock timing tool must be held in precise vertical alignment and requires considerable experience and a good sense of "feel" to achieve accurate and repeatable injector timing settings.

Injector timing tools have been developed for measuring injector plunger height on engines in which injector plunger position is controlled by an adjustable push rod connected to an end of the rocker arm opposite the plunger actuator end of the rocker arm. For example, U.S. Pat. No. 4,503,619 issued Mar. 12, 1985 to Nelsen, et al. for an INJECTOR HEIGHT MEASURING TOOL ASSEMBLY describes such a tool. However, the Nelsen, et al. timing tool cannot be used on rocker arm/injector arrangements that have the plunger adjustment means at the plunger actuator end of the rocker arm. For example, an adjustable ball stud mounted in the plunger actuator end of the rocker arm and an associated lock nut are used in the aforementioned EMD series diesel engines. This arrangement requires direct tool access to the ball stud and lock nut for adjustment of injector timing, a requirement prohibited by the Nelsen et al. timing tool which covers the plunger actuator end of the rocker arm.

The present invention is directed to overcoming the problems set forth above. It is desirable to have a fuel injector timing tool that does not require subjective "feel" and critical alignment to measure and set injector plunger position. It is also desirable to have such a tool that allows access to plunger position adjustment components mounted in the plunger activator end of the rocker arm.

SUMMARY OF THE INVENTION

In accordance with one aspect of the present invention, a timing tool for a fuel injector includes an elongated tubular member having a central passageway extending between upper and lower open ends. The upper end of the tubular member is adapted to receive a linear displacement measuring device. The timing tool also includes a base member having a first surface that is attached to the lower end of the elongated tubular member in perpendicular relationship with the central passageway of the tubular member. The base member also includes a second surface spaced from and parallel to the first surface that is adapted to be seated in contacting relationship on a retainer element of the fuel injector. The base member also has an aperture extending between the first and second surfaces in axially aligned relationship with the central passageway of the tubular member. The base member also has an end portion spaced from the aperture and is adapted to only partially circumscribe a plunger follower disposed on the retainer element of the fuel injector.

Other features of the timing tool embodying the present invention include the base member being magnetically attachable to the retainer element of the fuel injector.

Another feature of the timing tool embodying the present invention includes the aperture in the base member having a guide bushing disposed therein. The guide bushing has an internal diameter that is sufficient to provide guiding contact with a movable stem element of the linear displacement measuring device when the device is mounted on the upper end of the elongated tubular member.

BRIEF DESCRIPTION OF THE DRAWINGS

A more complete understanding of the present invention may be had by reference to the following detailed description when taken in conjunction with the accompanying drawings, wherein.

DETAILED DESCRIPTION OF THE INVENTION

Figure 1:
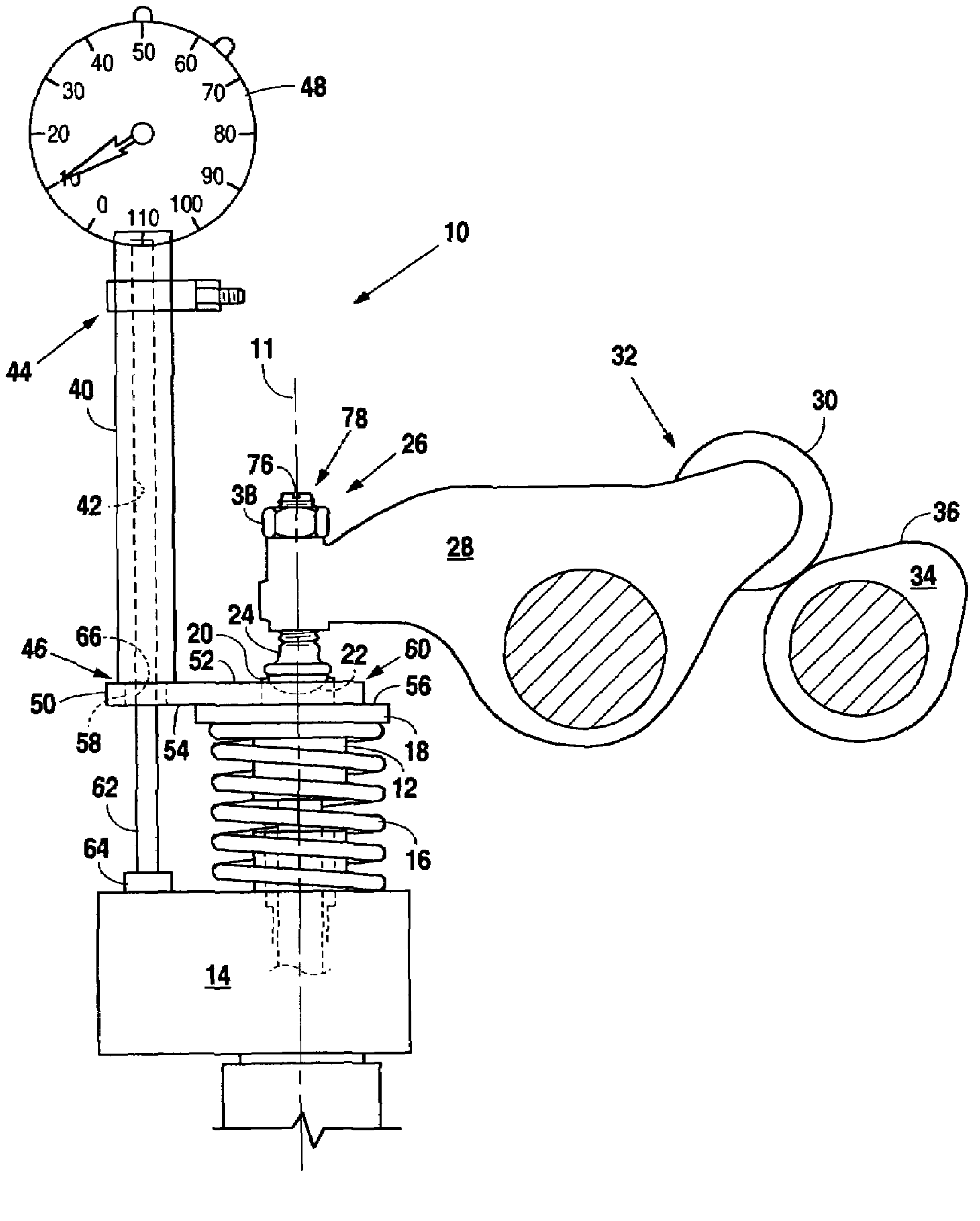
FIG. 1 is a vertical view of the plunger actuator end of a rocker arm and the fuel injector timing tool for measuring and setting plunger position in accordance with the present invention.
Figure 2:
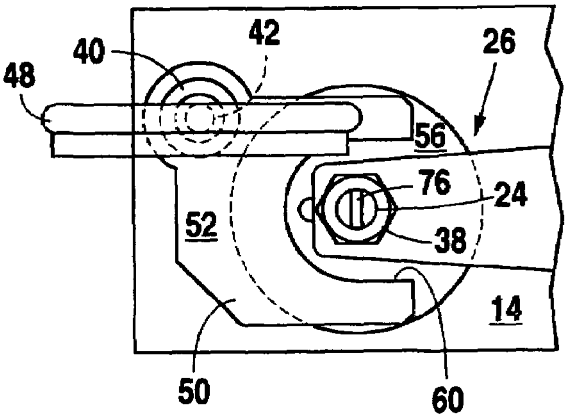
FIG. 2 is a top view of the plunger actuator end of the rocker arm and the fuel injector timing tool for measuring and setting plunger position in accordance with the present invention.

In accordance with the present invention, a timing tool 10 for measuring and setting the position of a fuel injector plunger 12 of a fuel injector 14, is shown in FIGS. 1 and 2. The plunger 12 of the fuel injector 14 is biased upwardly by a spring 16 acting on a retainer element 18 attached to an upper end of the plunger. A cup-shaped plunger follower 22 is slidably disposed on top of the retainer element 18 and is adapted to mate with a ball end 20 of an adjustable stud 24. The adjustable stud 24 is threadably mounted in a plunger actuator end 26 of a rocker arm 28. A roller follower 30 is rotatably mounted at an opposite, or cam follower, end 32 of the rocker arm 28 The plunger 12 of the fuel injector 14 is reciprocally moved along a generally vertical central axis 11 by the plunger actuator end 26 of the rocker arm 28 as determined by a cam 34. The roller follower 30 follows the predetermined profile contour surface 36 of the cam 34 and thereby controls the actual timing and position of the plunger 12. The adjustable ball stud 24 is maintained at a desired position within the plunger actuator end 26 of the rocker arm 28 by a lock nut 38.

In the preferred embodiment of the present invention, the timing tool 10 includes an elongated tubular member 40 having a central passageway 42 extending between a first, or upper, open end 44 and a second, or lower, open end 46. The upper end 44 of the tubular member is adapted to receive a linear displacement measuring device such as a dial indicator 48, as shown, or, if desired, other measuring devices, such as a digital linear indicator.

The timing tool 10 has a base member 50 having an upper, or first, surface 52. The lower end 46 of the elongated tubular member 40 is attached to the first surface 52 of the base member 50 such that the central passageway 42 of the elongated tubular member 40 perpendicular to the upper surface 52 of base member 50. The base member 50 also includes a lower, or second, surface 54 that is spaced from and generally parallel to the first surface 52. The lower surface 54 is adapted to be seated directly on an upper surface 56 of the retainer 18, perpendicular to the axis 11. The base member 50 has an through hole, or aperture, 58 that extends between the upper surface 52 and the lower surface 54 and is in axially aligned relationship with the central passageway 42 of the tubular member 40. Importantly, the base member 50 also an open end 60 that is spaced from the aperture 58 and is adapted to only partially circumscribe the plunger follower 20 disposed on the upper surface 56 of the retainer element 18, and abut an outer circumferential surface of the plunger follower to accurately center the timing tool 10 on the retainer 18.

The measuring device 48 has a stem portion 62 that extends through the central passageway 42 of the elongated tubular member 40, the aperture 58 in the base member 50 and further extends for a distance sufficient to contact a predetermined upper surface of the fuel injector 14. A distal, or contact end 64 of the stem 62 is suitably adapted to contact the upper surface of the fuel injector 14. In one embodiment, the contact end 64 of the stem 62 is knurled to reduce the effect of an oil film that may be present on the top surface of the fuel injector 14.

Desirably, a guide bushing 66 is disposed in the aperture 58 in the base member 50 and has an internal diameter sufficient to provide guiding contact with the movable stem 62 of the linear displacement measuring device 48.

In a preferred embodiment of the present invention, the base member 50 of the timing tool 10 is magnetically attachable to the upper surface 56 of the retainer element 18. The base member 50 may be formed of a magnetic or magnetized metal, or have one or more magnets recessed in, or otherwise fixedly mounted on, the bottom surface 54 of the base member 50. Thus, when the timing tool 10 is seated on the upper surface 56 of the retainer 18, the timing tool 10 can advantageously be used hands-free, allowing both hands to be used when adjustment is required, to loosen the lock nut 38, adjust the ball stud 24, and subsequently retighten the lock nut 38. By maintaining the timing tool 10 on the retainer 18 during the adjustment process, it can be easily observed that the critically set distance adjustment is not altered during tightening of the lock nut 38.

Figure 3:
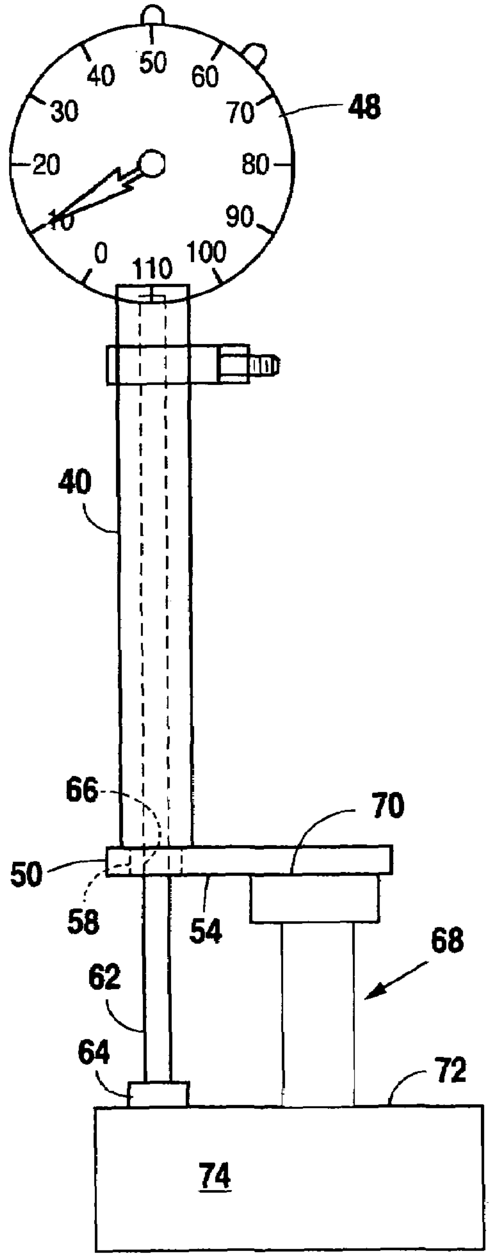
FIG. 3 is a vertical view of the fuel injector timing tool and a calibration block used to preset a desired extension of the stem of a measuring device below a bottom surface of the base of the timing tool.

FIG. 3 shows the timing tool 10, embodying the present invention, seated on a calibration block 68. The calibration block 68 has an upper surface 70 that is a closely toleranced predetermined distance from a top surface 72 of a base 74. Before using the timing tool 10 to measure and set plunger position, and accordingly the timing, of the fuel injector 14, the timing tool 10 is positioned on the base 74 as shown in FIG. 3. If desired, the upper surface 70 may have a cylindrical boss (not shown) extending upwardly from the upper surface with a diameter substantially the same as the diameter of the plunger follower 10. The cylindrical boss is thus suitably adapted to be received within, and partially circumscribed by, the open end 60 of the base member 50 and thereby center the timing tool 10 on the calibration block 68. The movable stem 62 of the linear distance measuring device 48 is then extended until the distal, or contact, end 64 of the stem 62 is in contact with the top surface 72 of the base 74. The indicator 48 is then "zeroed," or if desired, offset by a predetermined value. Also, if desired, separate calibration blocks may be used to provide different timing settings. For example, specific calibration blocks can be constructed to provide calibration of the measuring device 48 equivalent to the desired position of the retainer element 18 at various predetermined crankshaft settings, such as TDC or 0°, −2°, −4°, or −6° BTDC. After the thus calibrated measuring device 48 is removed from the calibration block 68 and seated on the upper surface 56 of the retainer 18 of the fuel injector 14, any deviation from the preset distance can be easily measured. For example, if the position of the plunger 12 is too high, the measuring device 48 will indicate a greater distance than desired between the top 56 of the retainer 18 and the predetermined surface of the fuel injector 14. To adjust the distance, the lock nut 38 is loosened with a suitable wrench, and an adjusting tool such as a screwdriver is inserted into a slot 76 provided on a projecting end 78 of the ball stud 24. The ball stud 24 is then adjusted downwardly until the desired predetermined distance, as indicated by the measuring device 48, is achieved. The lock nut 38 may then be retightened to retain the ball stud 24 at the adjusted position. In a similar manner, if the dial indicator indicates that the distance between the top surface 56 of the retainer 18 and the predetermined surface of the fuel injector 14 is too short, the lock nut 38 is loosened, the adjustable ball stud 34 screwed in a reverse direction to achieve the required predetermined distance, and the lock nut 38 retightened.

An important benefit of the timing tool embodying the present invention includes being able to rotate the linear distance measuring device 48 so that it is readily observable during timing adjustments. Also, the timing tool 10 can be used to measure injector plunger position as a function of crank angle degrees. Such measurements are typically done to verify that the lobe on the injector cam shaft is phased correctly with the crankshaft. Heretofore this measurement has been carried out by using a dial indicator on the top of the injector rocker arm. However, the geometry of the rocker arm follows an arc, thereby contributing some error to the accuracy of the measurement. The timing tool 10, embodying the present invention, measures only true vertical motion, thereby increasing the accuracy and repeatability of the measurements.

An important advantage of the injector timing tool 10, embodying the present invention, is that it may be used with a specific software program capable of accepting readings from a digital displacement measuring device 48 as an input value and perform specific calculations. Such a process may be easily automated by using an electronic digital indicator in connection with the timing tool 10 and a shaft encoder on the engine. The digital indicator output signal and the shaft encoder output signal may both be connected to a PC, the sensed values provided directly to the software, and a plot or table made of the entire plunger travel profile. To further automate this process, the engine may be turned by a hydraulically actuated bar tool. Alternatively, the PC could be replaced with a PDA or other small microprocessor based unit that accepts the measurement signals, stores the data, performs the calculations, and displays the results. The displayed results are very beneficial in checking a unit that has been timed in the traditional manner or if one is unsure about the timing at which the engine is set. It should be noted that cam shafts are sometimes replaced to provide specific timing events. Heretofore there has been no way to easily and quickly measure injector timing variations attributable to different cam shafts.

Although the present invention is described in terms of a preferred illustrative embodiment, those skilled in the art will recognize that the dial indicator described herein is for the purpose of illustration, and that other measurement devices, such as digital indicators, may be used in conjunction with the injector timing tool embodying the present invention. Such measurement devices are intended to fall within the scope of the following claims. Other aspects, features, and advantages of the present invention may be obtained from a study of this disclosure and the drawing, along with the appended claims.

We claim:

1. A timing tool for a fuel injector, comprising:

an elongated tubular member having a central passageway extending between first and second ends, said first end being adapted to receive a linear displacement measuring device;

a base member having a first surface disposed in perpendicular relationship with the central passageway of the tubular member and to which the second end of said elongated tubular member is attached, a second surface spaced from and parallel to said first surface and adapted to be seated in contacting relationship on a retainer element of said fuel injector, an aperture extending between said first and second surfaces in axially aligned relationship with said central passageway of the tubular member and an end portion spaced from said open aperture and adapted to only partially circumscribe a plunger follower disposed on said retainer element.

2. The timing tool, as set forth in claim 1, wherein the base member of said timing tool is magnetically attachable to said retainer element of the fuel injector.

3. The timing tool, as set forth in claim 1, wherein said aperture in the base member has a guide bushing disposed therein, said guide bushing having an internal diameter sufficient to provide guiding contact with a moveable stem element of said linear displacement measuring device when said device is mounted on said first end of the elongated tubular member.

4. A timing tool for a fuel injector having a plunger moveable along a generally vertical central axis of the plunger, a retainer having an upper surface, a plunger follower disposed on said upper surface and adapted to receive the ball end of an adjustable ball stud, said retainer, said plunger follower, and said ball stud being coaxially aligned with the central axis of said fuel injector plunger, said timing tool comprising:

a base member having an upper surface, a lower surface adapted for support on said upper planar surface of the retainer at a position perpendicular to said central axis of the fuel injector, an open aperture extending between said upper and lower surfaces, and a substantially open end spaced from said open aperture and adapted to only circumscribe only a portion of the plunger follower when said base member is supported on the retainer;

a tubular member disposed in spaced parallel relationship with said central axis of said fuel injector plunger and having a central passageway extending between upper and lower ends, said lower end being attached to the upper surface of said base member in coaxial alignment with said aperture extending through the base member and said upper end being adapted to support a linear displacement measuring device thereon.

5. The timing tool, as set forth in claim 1, wherein the base member of said timing tool is magnetically attachable to said retainer of the fuel injector.

6. The timing tool, as set forth in claim 1, wherein the open aperture of the base member has a guide bushing disposed therein, said guide bushing having an internal diameter sufficient to provide guiding contact with said stem portion of a linear displacement measuring device.

7. The timing tool, as set forth in claim 1, wherein the timing tool includes a calibration tool having a base and an upper surface, said upper surface of the calibration tool being spaced a predetermined distance from a top surface of the base and adapted to receive the second surface of the base member of the timing tool.

8. The timing tool, as set forth in claim 7, wherein said predetermined distance that the upper surface of the calibration tool is spaced from the top surface of the base of the timing tool is equivalent to the desired position of said retainer element upon which the second surface of the base member of the calibration tool is adapted.

* * * * *